United States

Cohen et al.

[11] 3,989,350
[45] Nov. 2, 1976

[54] MULTIMODE OPTICAL FIBER

[75] Inventors: Leonard George Cohen, Holmdel; James William Fleming, Jr., Fanwood; William George French, Plainfield, all of N.J.

[73] Assignee: Bell Telephone Laboratories, Incorporated, Murray Hill, N.J.

[22] Filed: Sept. 12, 1975

[21] Appl. No.: 612,646

[52] U.S. Cl. .................. 350/96 WG; 350/96 GN; 350/175 GN
[51] Int. Cl.² ........................................ G02B 5/14
[58] Field of Search........... 350/96 R, 96 WG, 96 B, 350/96 GN, 175 GN; 106/50, 54

[56] References Cited
UNITED STATES PATENTS

| | | | |
|---|---|---|---|
| 3,823,997 | 7/1974 | Gloge et al. | 350/96 WG |
| 3,904,268 | 9/1975 | Keck et al. | 350/96 WG |

OTHER PUBLICATIONS

J. B. Macchesney, P. B. O'Connor, H. M. Presby, "A New Technique for the Preparation of Low Loss ..." Proc. of IEEE, Sept. 1974, pp. 1280–1281.

Primary Examiner—John K. Corbin
Assistant Examiner—Rolf Hille
Attorney, Agent, or Firm—George S. Indig

[57] ABSTRACT

A multimode optical fiber waveguide with graded refractive index for lessening modal dispersion with the gradient produced at least in part by radially decreasing boron oxide content outwardly from the core center within a high silica glass core minimizes modal dispersion by use of a non-parabolic grading function. The optimum gradient for a simple binary borosilicate system for a wavelength of from approximately 0.5 to 1.1 micrometers corresponds with $\alpha = 1.77 \pm 10$ percent in the equation $n = n_1[1-2\Delta(r/a)^\alpha]^{1/2}$, in which $n_1$ is the axial core index $r$ is the distance from the fiber axis, $a$ is the core radius, $\Delta$ is the relative index difference between core center and cladding and $\alpha$ is a power law exponent which characterizes the profile.

5 Claims, 2 Drawing Figures

MULTIMODE OPTICAL FIBER

BACKGROUND OF THE INVENTION

1. Field of the Invention

The invention is concerned with multimode fibers for use as transmission lines in communications systems operating in the visible or near-visible spectra. Fibers of concern include a core region with decreasing refractive index from the center of the core in a radial direction. The purpose of the gradient is to compensate for the differing mode-dependent group velocities so as to lessen pulse spreading due to this mechanism.

2. Description of the Prior Art

Optical communications systems under general study popularly depend on a glass fiber transmission guide. A form under widespread investigation designed for use over medium and long distances utilizes a guide of sufficiently large dimension to accommodate many modes in addition to the fundamental. Multimode transmission guides have the advantage of energy conservation of particular interest for a particular class of radiation sources now available. An early recognized disadvantage of multimode transmission is the mode-dependent group velocity resulting in increasing residence time for higher order modes. The result of this "mode dispersion" phenomenon is to lessen the usable bandwidth of the system. This is most easily visualized for a pulse system in which the pulse broadens during transmission due to the varying differing group velocities of the many modes entering into its composition. The ultimate bandwidth limitation coincides with sufficient distance to result in smearing of successive pulses (or in the smearing of successive information bits in analog systems—e.g., the disappearance of amplitude variations in an AM system).

Workers have recognized for some time that modal dispersion may be lessened by providing a refractive index variation such as to compensate for mode-dependent group velocity variations. In simple terms, this approach simply provides a lower index and, therefore, more rapid medium in the outer sections of the core through which a statistically greater fraction of the higher mode energy is transmitted.

For some time it was believed that a parabolically varying index would accomplish minimization of mode dispersion. This initially simple concept has evolved into a somewhat more complex gradient function which takes into account the previously ignored dispersive effect due to the index-modifying dopant introduced to accomplish the desired variation. This has culminated in a paper by Robert Olshansky and Donald B. Keck published at page TuC5-1 et seq. of the technical digest *Optical Fiber Transmission*, (a digest of technical papers presented at the Topical Meeting an Optical Fiber Transmission. January 7–9, 1975, Williamsburg, Virginia).

It was early recognized that minimum mode dispersion coincides with gradient defined by the equation:

$$n = n_1[1-2\Delta(r/a)^\alpha]^{1/2}, \quad 1$$

(see 52, *Bell System Technical Journal*, p. 1563 (1973)) in which $n_1$ is the index maximum, $r$ is the distance from the fiber axis, $a$ is the core radius, $\Delta$ is the relative index difference between core center and cladding, $\alpha$ is a power law exponent which characterizes the profile.

In accordance with Olshansky and Keck, supra., $\alpha$ is defined as:

$$\alpha = 2+y-\Delta(4+y)(3+y)/(5+2y) \quad 2$$

in which y is $= -2n_1/N_1 \, \lambda/\Delta \, d\Delta/d\lambda,$ 3

$N_1$ is the axial group refractive index and $\lambda$ is the wavelength. The function $y$ was obtained from measurements made on bulk glass. The factor now found to be of significance involves the wavelength dependence of the refractive index.

For the particular system studied by Olshansky and Keck, for a $TiO_2$ doped $SiO_2$ graded fiber, the predicted deviation from the simple parabolic function is dramatic.

A waveguide alternative to the $TiO_2$ doped silica fiber depends upon a lessening of refractive index by an outwardly increasing content of $B_2O_3$ also in a high silica glass. This work is described, for example in U.S. Pat. No. 3,778,132. Preliminary studies have indicated that modal dispersion is not improved on the basis of measurements made on bulk glass samples of borosilicate glass following the Olshansky-Keck developed approach. In fact, it appears that modal dispersion is worsened as compared with fibers using the simple parabolic index gradient.

SUMMARY OF THE INVENTION

Optical fibers manifesting reduced mode dispersion are described. Mode dispersion reduction is accomplished in high silica glass composition cores by the use of graded refractive index profiles with such profiles resulting from a variation in concentration of index-modifying dopant symmetrically in a radial direction in the core. An inventive requirement is that index profiling be accomplished by grading to a minimum index region which is essentially borosilicate. Boron oxide, as is known, causes a reduction in index so that the inventive fibers like those reported previously, incorporate an increasing boron oxide content in a direction from the center of the core.

For the simplest case, in which the only dopant present is boron oxide, a fiber may consist simply of a central-most core portion of unmodified silica with concentration of boron oxide increasing in accordance with the inventive profile to some finite level symmetrically from the center-most portion. The inventive teaching is, however, more general and covers the case for ternary or quaternary and even more complex compositions.

As will be seen from the Detailed Description, the profile, in accordance with the invention, is neither parabolic nor does it follow the teachings of Olshansky and Keck, supra.

DETAILED DESCRIPTION

1. Characterized of the Inventive Profile

It is convenient to describe th refractive index profile in terms of the exponent $\alpha$ in equation (1):

$$n = n_1[1-2\Delta(r/a)^\alpha]^{1/2}.$$

in which $n_1$ is the index maximum, $r$ is the distance from the fiber axis, $a$ is the core radius, $\Delta$ is the relative index difference between the core center and cladding and $\alpha$ is a power law exponent which characterizes the profile.

The equation set forth in the preceding paragraph is developed in 52, *Bell System Technical Journal*, page 1563 (1973). At this time, the equation has received acceptance of workers as defining the desired multimode gradient; and background, as well as mathematical development, is not repeated in this description. In essence, the invention is concerned with the value of $\alpha$ in the above equation so that reference to this term in further discussion will be understood as referring to the exponent $\alpha$.

2. The Figures

Figure 1:
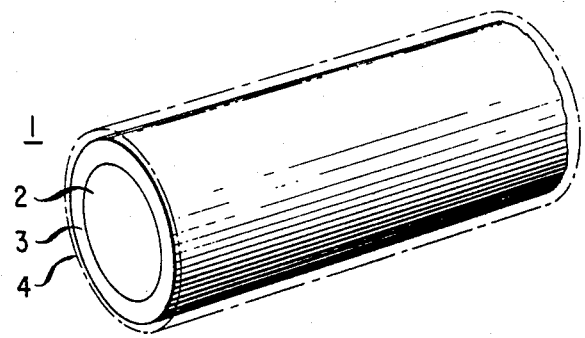
FIG. 1 is a perspective view of a fiber section in accordance with the invention.

FIG. 1 depicts a guide 1 which includes a core section 2, a clad region 3, as well as an optional coating 4. The inventive teaching is largely concerned with core region 2 which evidences a gradient in refractive index. The gradient which defines a symmetrically reducing refractive index from the center of core 2 to the interface between core 2 and clad 3 is of the form represented by equation (1). The inventive teaching is largely concerned with the value of $\alpha$ as assigned to a core region in which the peripheral portion (that portion at or immediately within the interface between core 2 and clad 3) is primarily borosilicate.

While the invention is broader, it is described in terms of a preferred embodiment, in which the peripheral region of the core consists essentially of borosilicate along with no other refractive index modifiers. Such a preferred embodiment results in a maximum value of numerical aperture (na). Further, the inventive teaching is entirely dependent upon a peculiarity of borosilicate glass which renders extended reasoning based on earlier estimates inapplicable.

So, for example, a ternary glass system in accordance with the invention might consist of germaniasilicate at the center portion of the core and borosilicate at the peripheral region of the core in accordance with the preferred embodiment.

Clad region 3 is primarily responsible for optical guiding. It is generally, although not necessarily, of constant refractive index, and within the context of this invention is likely to consist of borosilicate of an index equal to that of the ultimate low value attained in the gradient within the core. Commonly, such a borosilicate clad may consist of 14 mole percent boron oxide, remainder silica. A more general range may be defined as lying between 10–20 mole percent boron oxide, remainder silica. In this example, a 14 mole percent boron oxide, remainder silica, composition at the low index end of the core gradient for a binary glass system yields a $\Delta$ in equation (1) above of about 0.005.

Coating 4, shown in phantom, is optional and, in general, serves no optical function. It may consist of a silica layer and/or an organic layer designed to prevent microscratching during processing.

Figure 2:
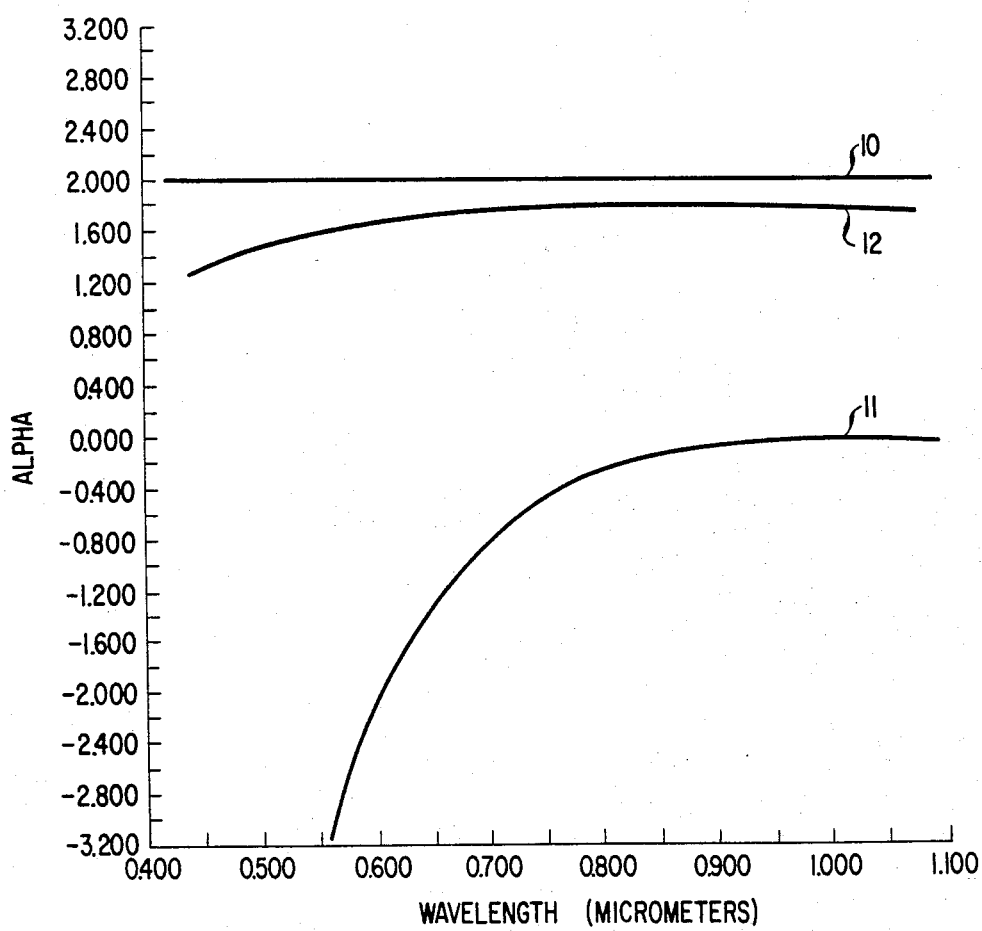
FIG. 2, on coordinates of $\alpha$ on the ordinate and wavelength in micrometers on the abscissa, shows the relationship between these two values for a borosilicate multimode fiber. The significance of the exponent $\alpha$ is discussed under Section 1 of th Detailed Description.

FIG. 2, on coordinates of $\alpha$ on the ordinate and wavelength in micrometers on the abscissa, includes three curves showing the interrelationship between these two parameters. Curve 10, a horizontal line at $\alpha = 2$ depicts the parabolic gradient initially considered by most workers to be optimal. Curve 11 represents the $\alpha$ values derived from the prior art Olshansky-Keck article cited in the Description of the Prior Art. Curve 12 sets forth the $\alpha$ values as derived in accordance with the present invention for the exemplary binary borosilicate glass system. Anticipating the Detailed Description it is noted that curve 12 defines a near-optimum gradient for a multimode fiber of from approximately 80 –0 130$\mu$m in outside dimension (that is, the entire glass fiber structure as drawn). It will be seen that, while the curve may be shifted somewhat for significantly differing outside dimension, it is not affected by organic or any additional coatings added after drawing which may be included for physical protection or cabling purposes. Comparison of curve 12 with prior art curves 10 and 11 reveals a marked difference corresponding with drastically improved multimode guiding. While curve 12 sets forth optimal $\alpha$ values, significantly improved guiding (lessening of broadening due to modal dispersion) is still significant for off-optimal $\alpha$ values; and for these purposes, $\alpha$ values within a tolerance of $\pm 10$ percent are indicated. It is noteworthy that the $\alpha$ value of curve 12 is approximately constant over a wavelength range of from 0.5 to 1.1 $\mu$m ($\alpha$ approximately equal to 1.77 under the conditions noted).

Curve forms for ternary systems under the conditions noted ($B_2O_3$ the only index-modifying dopant at the low index end of the gradient) are not set forth in FIG. 2. Such curves which reflect varying values of $\alpha$ depending upon total $\Delta$ depend upon precise terminal gradient index values for any given wavelength. Calculation of any such curve is to be carried out in accordance with the detailed instruction set forth in Section 3.

3. Design Criteria

It has been indicated that the invention is premised on borosilicate glass at least within that region representing the low index end of the core gradient. The $\alpha$ calculations in the literature are considered sufficiently accurate for non-boron oxide-containing glass fibers. The inventive finding is largely premised on the fact that reduced index in a borosilicate system is based on structural considerations which, in turn, depend upon the thermal history of the glass. Curve 12 of FIG. 2 sets forth $\alpha$ values for usual multimode fiber structures. Such a fiber as drawn has an O.D. of approximately 80 to 130 $\mu$m and a core region of a diameter of approximately 30 to 80 $\mu$m. The values et forth are applicable to fibers in which quenching results inherently by direct air cooling. The drop in temperature from the softening point is sufficiently large that forced cooling or likely possible annealing is of little consequence. Correction in $\alpha$ value from values derivable from the literature are greater for smaller dimensions and less for larger dimensions. However, changes introduced in such $\alpha$ values for contemplated changes in fiber diameter the drawn, i.e., $\pm 25$ percent of the above range, do not result in so large a change in quenching conditions as to require revised $\alpha$ values. While multimode fibers of still smaller or still larger dimensions are not now considered desirable—on the one hand, by reason of reduction in modal capacity—on the other, by reason of diminishing return in terms of total energy capacity—the correction in $\alpha$ value with diameter may be estimated as being approximately linear with an O.D. fiber diameter of 1,000 $\mu$m equal to the bulk measured value. It has been noted that the refractive index profile shape of the cylindrical waveguide designed for multimode guiding to produce minimum modal dispersion can be described by Equation (1). Early analysis suggested a parabolic index—i.e., $\alpha = 2$. More recent work, as described above, suggested that the value was an over-simplification and that dispersive refractive index differences for the different constituents of the glass resulted in a dependence on wavelength (profile dispersion) as well. Specifically, it was shown in Equation(2) that:

$$\alpha = 2 + y - \Delta(4 + y)(3 + y)/(5 + 2y)$$

where $y$ equals $-(2n_1/N_1 \, \lambda/\Delta \, d\Delta/d\lambda)$;

$n_1$ is the axial refractive index;
$N_1$ is the axial group refractive index;
$\lambda$ is the wavelength; and
$\Delta = n_1 - n_2/n_1$.

In accordance with this finding as reported by Olshansky and Keck, supra., values for Equation (4) could be determined by direct measurement in bulk glass of the compositions corresponding with axial and peripheral core compositions.

In accordance with the invention, it is found that bulk glass measurement is not a reliable criterion where compositions involve boron oxide. Specifically, it is found that the dispersion curve for any fiber glass borosilicate composition can be determined from the dispersion curve resulting from direct bulk glass measurement by correcting the index values to account for the change in index which is, in turn, dependent on the difference in thermal history in the bulk and fiber samples. In particular, studies have indicated that an increment of 0.007 must be subtracted from bulk-glass measured indices to approximate the fiber case. As indicated, this correction factor is appropriate for present and contemplated fiber dimensions based on present, as well as expected, processing parameters. Whereas $\Delta$, where it appears in the above equations, is defined as $n_1 - n_2/n_1$ (where $n_1$ is the axial index and $n_2$ is the low peripheral core index with both values measured in bulk glass, in accordance with the invention, $\Delta$ becomes $n_1 - (n_2 - 0.007)/n_1$).

In essence, the value of 0.007 represents that correction between index for a bulk sample and that of the actual fiber.

The essence of the invention is so expressed: the value of $\Delta$ which determines the coordinates of the profile curve is determined only by end point indices of the gradient. Accordingly, modifying the fiber by substituting, e.g., germania-silica for silica at the core axis, simply indicates a change in value for $n_1$. The same is true of more complex glasses; and within the rule set forth above, the correction factor of 0.007 is similarly applied to the low index terminus. Any profile may, therefore, be calculated directly from the equations set forth so as to yield data applicable to such multicomponent fibers.

4. The Example

A flow system was set up within an envelope consisting of a tube of commercial grade fused silica, the dimensions of the tube being 14 mm I.D. by 16 mm O.D. and 90 cm. long. A flowing gas mixture of silicon tetrachloride, $SiCl_4$, boron trichloride, $BCl_3$, and oxygen were introduced at the respective flow rates of 66 cc/minute, 22.6 cc/minute, and 780 cc/minute. Tube and contents were heated by a 17 cm/minute, moving hot zone 5 cm in length produced by a multi-jet oxyhydrogen torch. Particulate matter was observed to form in the general region of the torch and was observed to travel downstream with such matter lodging as a white deposit on the inner surface of the tube downstream of the hot zone. Deposition was most pronounced over the downstream region of the approximate length 10 cm and trailed off to a still perceptible deposit at the exit end of the tube. As the hot zone moved downstream, the visible white deposit fused to result in a substantially thinner transparent glassy film. The sequence was repeated 35 times with rapid re-traversal of the hot zone following each successive downstream movement. The resulting glass layer of approximate thickness 0.3 mm was designed to serve as an optical clad. A graded core region was thereafter deposited by following the same general procedure with the same rate of movement of the same oxyhydrogen torch assembly, however, varying the composition of the flowing gas mixture from the initial composition over a total of 31 passes with the ultimate composition consisting solely of $SiCl_4$ and oxygen in the approximate amounts of 66 cc/minute $SiCl_4$ and 780 cc/minute $O_2$. The amount of $BCl_3$ was reduced in accordance with the equation $$\text{Flow rate } BCl_3 = (22.6 \text{ cc/min}/31)(31-I)^{1.12}$$

in which I was the pass number. The total layer thickness produced by the 31 passes was approximately 0.2 mm resulting in a total deposited film thickness of 0.5 mm.

The tube, together with deposited layers, was then collapsed. Collapse was accomplished by stopping gas flow and increasing temperature by gradually decreasing the traversal velocity of the oxyhydrogen torch assembly. Collapse occurred after ten passes at a zone velocity of approximately 1.2 cm/minute. Collapsing was visually observed as conversion of tube and contents to a solid rod in the direction of torch movement.

The collapsed assembly, now known as a preform, was of approximate dimensions 9 mm diameter and 35 cm long. This length, representing the region of uniform deposition, was removed from the entire original tube by local melting and drawing to severance.

Fiber drawing to produce a fiber of an approximate outside diameter of 100 micrometers was produced by passing the preform through a muffle furnace which resulted in local heating to a temperature of approximately 2,000° C and by pulling the heated region at a steady state velocity of approximately 1 meter/second. The ultimate fiber length was approximately 1100 meters with such length being limited by the fiber drawing facility.

An experimental determination was made to empirically identify optimum $\alpha$. The technique utilized depended upon the fact that $\alpha$ values in excess of optimal results in relative delay of high order modes, while $\alpha$ values less than optimal results in fundamental ray delay. The experimental procedure used circular irises and annular rings. Light propagating through such spatial ray filters was collected and focused onto a detector. Spatially filtered impulse response shapes were measured in fibers of varying $\alpha$ after 1 kilometer of propagation. Fibers under study had a numerical aperture approximately equal to 0.14 and a near optimal profile—i.e., in which there was virtual coincidence of fundamental and high mode peaks for $\lambda = 907.5$ nm (corresponding with the particular GaAs injection laser used) resulted in a fiber of an $\alpha$ value of approximately 1.77 as measured by interferometric techniques. This value, it may be seen, agreed quite well with the corresponding point on curve 12 of FIG. 2.

What is claimed is:

1. Glass transmission line for the transmission of electromagnetic radiation centering about a wavelength within the range of from 0.5 to 2.0 $\mu$m, said line comprising a core member manifesting a radially decreasing refractive index for said radiation from the axial core composition to the peripheral core composition, together with a cladding about said core, in which the said core consists essentially of $SiO_2$ and at least one refractive index modifying ingredient, in which the gradient within the said core is due at least in part to a radially increasing concentration of boron oxide, $B_2O_3$, to an ultimate peripheral core composition which is essentially borosilicate containing from 10 mole percent $B_2O_3$ to 20 mole percent $B_2O_3$, the said gradient approximating the form:

$$n = n_1[1-2\Delta(r/a)^\alpha]^{1/2},$$

in which the $n_1$ is the index maximum, $r$ is the distance from the fiber axis, $a$ is the core radius, $\Delta$ is the relative index difference between core center and cladding and $\alpha$ is a power law exponent which characterizes the profile, characterized in that $\Delta$ is equal to $n_1 - (n_2 - 0.007)/n_1$, $n_1$ and $n_2$ are index values as measured in bulk samples of glass of the compositions represented, respectively, by the axial core composition and the peripheral core composition.

2. Line of claim 1 in which the peripheral core composition consists essentially of borosilicate glass.

3. Line of claim 2 in which the axial core composition consists essentially of germania silicate.

4. Line of claim 2 in which the axial composition consists essentially of silica.

5. Line of claim 4 in which the electromagnetic radiation centers about a wavelength within the range of from about 0.5 to 1.1 $\mu$m and in which the numerical value of $\alpha$ is 1.77 $\pm$ 10 percent.

* * * * *